Figure 1:
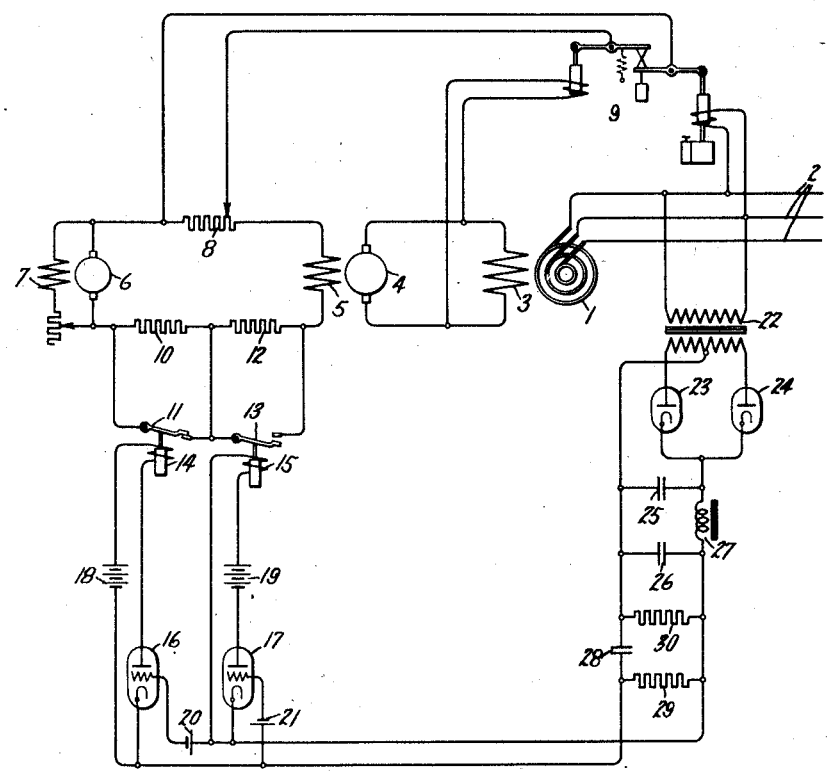

May 23, 1933.    A. S. FITZ GERALD    1,911,074
REGULATING SYSTEM
Filed Aug. 14, 1931

Inventor:
Alan S. FitzGerald,
by Charles E. Fuller
His Attorney.

Patented May 23, 1933

1,911,074

UNITED STATES PATENT OFFICE

ALAN S. FITZ GERALD, OF WYNNEWOOD, PENNSYLVANIA, ASSIGNOR TO GENERAL ELECTRIC COMPANY, A CORPORATION OF NEW YORK

REGULATING SYSTEM

Application filed August 14, 1931. Serial No. 557,121.

My invention relates to regulating systems and more particularly to regulating systems employing electric discharge devices for controlling an electrical characteristic of a dynamo-electric machine or circuit.

Various regulating systems employing electric discharge devices have been proposed in the past for regulating the voltage or other electrical condition of a machine or circuit. Many of these regulating systems when utilized in connection with the synchronous apparatus of power transmission systems are incapable of effecting a change in excitation of sufficient magnitude and with sufficient rapidity to prevent instability or loss of synchronism between the synchronous machines of the system under sudden changes of load accompanying switching, faults and short circuits.

It is an object of my invention to provide a new and improved regulating system utilizing electric discharge devices which shall be effective to regulate a dynamo-electric machine or circuit in accordance with the rate of change of a condition to be regulated.

A further object of my invention is to provide an improved regulating system for quickly changing the regulating current of a dynamo-electric machine or circuit upon the occasion of abnormal operating conditions.

Another object of my invention is to provide a new and improved system of regulation which shall be operative to effect proper regulation of a dynamo-electric machine or circuit under small and gradual changes in the condition to be regulated as well as during large and sudden changes.

A still further object of my invention is to provide a new and improved arrangement for controlling an electric discharge device in accordance with the rate of change of a variable condition.

In accordance with my invention means responsive to the rate of change of the regulated condition is arranged to control the charge on a capacitor in such a manner that a sudden increase or decrease in the regulated condition from its normal value will cause a transient charge or discharge of the capacitor. The transient voltage resulting therefrom is applied to the control electrode of an electric discharge device so as to control the anode current and thereby actuate special control devices of the electro-mechanical or electric discharge type for controlling the condition to be regulated. As an alternative the rate of change of the regulated condition may be applied to the control electrode of an electric discharge device through an inductive coupling such as a transformer or reactor.

My invention will be better understood from the following description taken in connection with the accompanying drawing and its scope will be pointed out in the appended claims.

Figure 2:
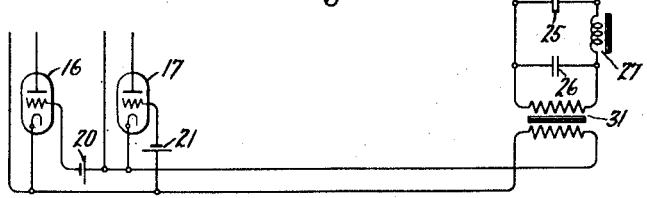

In the accompanying drawing Fig. 1 is a diagrammatic representation of one embodiment of my invention, and Fig. 2 is a modification of the arrangement illustrated in Fig. 1.

Referring to Fig. 1 of the accompanying drawing, 1 denotes a dynamo-electric machine shown as a synchronous three-phase alternator which is connected to a power circuit 2. The alternator 1 is provided with a field winding 3 which is connected to be energized by a direct current generator or exciter 4. The exciter 4 is provided with a field winding 5, which may be energized from the exciter 4 in the usual manner of a self-excited dynamo-electric machine, but for use with large synchronous machines it is preferably excited from an independent generating source illustrated as a sub-exciter 6 having a self-excited field winding 7. In the circuit between field winding 5 and sub-exciter 6 I have shown a resistance 8 which is connected to be controlled by a regulator 9. The resistance 8 and regulator 9 are merely illustrative of any type of regulator either electromechanical or of the type utilizing electric discharge devices exclusive of mechanical or moving parts suitable for controlling the alternator 1 under small and gradual changes in the condition to be regulated. The regulator 9 is diagrammatically represented as of the vibratory type periodically short circuiting and inserting resistance 8 in the excitation circuit.

In accordance with my invention additional means are provided for taking over or supplementing the regulation effected by regulator 9 during large and sudden changes in the condition to be regulated. This supplemental regulation is so arranged as to increase or decrease the energization of field winding 5 in large increments in case the voltage of alternator 1 suddenly decreases or increases. Any suitable means capable of effecting this type of energization may be employed whether of the type utilizing electric discharge devices exclusively or of the electromechanical type. For purposes of illustration I have shown a regulator of the electromechanical type comprising a resistance 10 connected in circiut with field winding 5 and normally short circuited by a relay 11, and a resistance 12 likewise connected in circuit with field winding 5 and shunted by a normally open relay 13. Relays 11 and 13 are provided with electromagnetic operating means 14 and 15, respectively. Electric discharge devices, 16 and 17, each provided with an anode, a cathode, and a control electrode, are provided for energizing the electromagnetic operating means 14 and 15 respectively. A source of plate potential is connected in the respective anode circuits of the discharge devices and is represented by batteries 18 and 19. The grid circuits of the discharge devices 16 and 17 are provided with bias batteries 20 and 21, respectively, in order to render the discharge devices non-conducting or insufficiently conductive to operate the respective relays 14 and 15 from their normal, or illustrated position during small and gradual changes in the regulated condition.

In order to render one or the other of the discharge devices 16 or 17 conductive at the proper time I provide means for obtaining under abnormal conditions a transient voltage in accordance with the rate of change of the regulated condition or any other selected condition such as current, power, etc. As illustrated in the drawing this is accomplished by means of a rectifier arrangement comprising a transformer 22 having a primary winding connected to be energized from the line 2 in accordance with the voltage, and a secondary winding having its respective terminals connected to electric discharge devices 23 and 24. The electric discharge devices 23 and 24 are each provided with an anode and a cathode but may be taken as illustrative of any suitable type of rectifier. The rectified voltage is preferably filtered by any suitable type of filter illustrated as comprising parallel connected condensers 25 and 26 and a series connected inductance 27 connected therebetween. The output terminals of the filter circuit are connected to the terminals of a capacitor 28 through a resistance 29. A second resistance 30 is connected in a circuit across capacitor 28 and resistance 29 to form a discharge path for the capacitor when the voltage is higher than the output voltage of the filter circuit. Connections are made from the resistor 29 to the grid circuit of the electric discharge devices 16 and 17 in order that the transient voltage appearing thereacross may be utilized to render one or the other of the discharging devices conducting depending upon whether the capacitor 28 is being charged or discharged.

The operation of the illustrated embodiment is as follows: It will be assumed that the alternator 1 and its exciters are in operation and that regulator 9 is functioning to maintain the predetermined normal voltage of circuit 2. Initially the capacitor 28 will be charged corresponding to the normal voltage of circuit 2 through the rectifying unit. After the initial charge resistance 30 is traversed by a steady rectified direct current when the alternator voltage is constant and resistance 29 carries no current so long as the alternator voltage is steady. The potential of the grids of the discharge devices 16 and 17 is adjusted so that these devices are rendered non-conducting with zero voltage drop across resistance 29 thereby to maintain relays 11 and 13 in their illustrated position. Since relay 11 normally short circuits resistance 10 we may refer to this relay as the "lowering" relay in view of the fact that when it is operated from its illustrated position resistance 10 is inserted in the circuit of field winding 5 and acts to decrease the excitation of the alternator 1. Similarly, relay 13 may be referred to as the "raising" relay since when it is operated from its illustrated position resistance 12 is short circuited and the excitation of the alternator 1 is increased.

For purposes of explanation it will be assumed that when the capacitor 28 is being discharged the right hand terminal of resistor 29 will be negative and the left hand terminal will be positive. Now assume that the voltage of circuit 2 suddenly decreases due to switching, a fault or a short circuit. As a result the voltage across capacitor 28 will be higher than the voltage across the charging circuit and this capacitor will discharge through the resistance 29 and the resistance 30. As a result the polarity of the terminals of resistance 29 will under the assumed conditions be such that the grid potential of discharge device 17 will become sufficiently positive to energize the operating coil 15 to actuate "raising" relay 13 and short circuit resistor 12. A forcing action suddenly to raise the voltage of the alternator field winding 3 is obtained. If the voltage of circuit 2 suddenly increases the capacitor 28 will be rapidly charged so as to produce a voltage across the resistor 29 with the polarity reversed from that assumed under the discharging conditions. This action makes the grid potential of the discharge device 16 sufficiently positive to energize operating coil 14 to actuate "lowering" relay 11 and insert resistance 10 in the field winding of exciter 4. A forcing action suddenly to lower the voltage of the alternator field winding 3 is obtained.

In the preferred embodiment of my invention the forcing action is supplementary to the normal regulator action effected by regulator 9 and owing to the response in accordance with the rate of change of the variable condition the action is necessarily limited to very short periods of time. Consequently, the forcing effect on the field of the exciter 5 or alternator field winding 3 may be made of an extreme nature.

Fig. 2 illustrates a modification of the invention and shows how the principle involved in this regulating system may be carried out by utilizing an inductive coupling between the direct current circuit of the rectifier and the grid circuit of the valves 16 and 17. For simplicity of illustration I have merely shown a portion of the system shown in Fig. 1 but the manner in which the parts are connected will be evident since like numerals have been used for the similar elements of the control circuit. Instead of arranging the filtered output of the rectifier arrangement to charge the capacitor 28 I connect the primary winding of a transformer 31 across the output terminals of the filter, and the secondary winding to the grid circuits of the respective discharge devices 16 and 17.

The operation of this modification is substantially the same as the embodiment illustrated in Fig. 1. With the inductive coupling a sudden change in the output of the rectifier unit sets up a voltage across the terminals of the secondary winding of transformer 31 the polarity of which depends upon whether the direct current suddenly decreases or increases. As a result either the discharge device 16 or 17 is made conducting momentarily to effect a decrease or increase in the voltage of the alternator field winding 3.

While I have shown a particular embodiment of my invention it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:—

1. In combination, an electric circuit, means comprising electric discharge means operative to control an electrical characteristic of said circuit upon departure in either direction from a predetermined value, and means responsive to the rate of change of an electrical characteristic of said circuit from a predetermined value for selectively controlling said discharge means in accordance with the direction of change in said last mentioned electrical characteristic.

2. In combination, an alternating current circuit, means comprising an electric discharge device connected to control an electrical characteristic of said circuit, means for rectifying an electrical characteristic of said circuit, and means operative in accordance with the rate of change of current in the output circuit of said rectifying means for controlling said discharge device.

3. In combination, an alternating current circuit, means comprising an electric discharge device connected to control an electrical characteristic of said alternating current circuit, means for rectifying an electrical characteristic of said circuit, a capacitor connected to be suddenly charged or discharged when the rectified voltage from said rectifying means suddenly increases or decreases above or below a predetermined value, and means responsive to the charge or discharge of said capacitor for controlling said electric discharge means.

4. In combination, an alternating current circuit, means comprising an electric discharge device provided with an anode, a cathode and a control electrode, and connected to control an electrical characteristic of said alternating current circuit, means for rectifying said electrical characteristic, a capacitor connected to be charged from said rectifying means, a resistance in series relation with said capacitor, a discharging circuit for said capacitor through said first resistance, said first resistance being connected to control the potential of said control electrode with respect to said anode in accordance with the transfer of energy to or from said capacitor.

5. In combination, an electric circuit, means comprising electric discharge means operative to change an electrical characteristic of said circuit in either direction from a predetermined value, an inductive coupling responsive to the rate of change of an electrical characteristic of said electric circuit for selectively controlling said discharge means in accordance with the direction of change of said last mentioned electrical characteristic.

6. In combination, an alternating current electric circuit, means comprising an electric discharge device connected to control an electrical characteristic of said circuit, means for rectifying said electrical characteristic, a transformer having a primary winding connected in the direct current circuit of said rectifying means and a secondary winding connected to control said electric discharge device in accordance with transient variations of current in said primary winding.

7. In combination, an electric discharge device, a variable potential direct current source, an energy storage means connected in circuit with said direct current source and arranged for an abrupt transfer of energy therebetween when the potential of said source increases above the potential of said energy storage means by sudden and relatively large increments, and means responsive to the transient energy flow to said energy storage means for controlling said electric discharge device.

8. In combination, an electric discharge device, a variable potential direct current source, an energy storage means connected in circuit with said direct current source and arranged for an abrupt transfer of energy therefrom when the potential of said source decreases below the potential of said energy storage means by sudden and relatively large decrements, and means responsive to the transient energy flow from said energy storage means for controlling said electric discharge device.

9. In combination, a pair of electric discharge devices, a variable potential direct current source, an energy storage means connected in circuit with said source and arranged for an abrupt transfer of energy to said energy storage means when the potential of said source increases above the potential of said energy storage means by sudden and relatively large increments and arranged for an abrupt transfer of energy from said energy storage means when the potential of said source decreases below the potential of said energy storage means by sudden and relatively large decrements, and means for selectively controlling said discharge devices in accordance with the direction of said energy flow.

10. In combination, an electric discharge device, a variable potential direct current source, a capacitor connected to be abruptly charged from said source when the potential of said source increases above the potential of said capacitor by sudden and relatively large increments, and means for controlling said electric discharge device in accordance with the current charging transient of said capacitor.

11. In combination, an electric discharge device, a variable potential direct current source, a capacitor connected to be abruptly discharged when the potential of said source decreases below the potential of said capacitor by sudden and relatively large decrements, and means for controlling said electric discharge device in accordance with the current discharging transient of said capacitor.

12. In combination, a pair of electric discharge devices, a variable potential direct current source, a capacitor connected to be abruptly charged from said source when the potential of said source increases above the potential of said capacitor by sudden and relatively large increments and arranged to be abruptly discharged when the potential of said source decreases below the potential of said capacitor by sudden and relatively large decrements, and means responsive to the charging or discharging transient of said capacitor for selectively controlling said discharge devices.

13. In combination, a pair of electric discharge devices, a variable direct current source, a transformer having a primary winding connected in series relation with said source and a secondary winding connected to be energized in accordance with current transients in said primary winding, said secondary winding being connected to render one of said discharge devices conducting in accordance with an increasing current transient in said primary winding and to render the other of said discharge devices conducting in accordance with a decreasing current transient in said primary winding.

14. In a regulating system, an alternating current circuit, regulating means for controlling an electrical characteristic of said circuit for small and gradual changes therein, and means comprising electric discharge means operative in response to the rate of change of an electrical characteristic on large and sudden changes therein for abruptly controlling said electrical characteristic for periods of relatively short duration.

15. In a regulating system, an alternating current circuit, regulating means for controlling the voltage of said circuit for small and gradual changes therein, means for rectifying said voltage, a capacitor connected to be charged from said rectifying means, a discharging circuit for said capacitor, and means comprising electric discharge means for abruptly controlling the voltage of said circuit in accordance with the transient flow of energy to or from said capacitor.

16. In a regulating system, an alternating current circuit, regulating means for controlling the voltage of said circuit for small and gradual changes therein, means for rectifying said voltage, a transformer having a primary winding connected to be energized in accordance with said rectified voltage and a secondary winding connected to be energized in accordance with current transients in said primary winding, and electric discharge means connected to control said regulating means in accordance with increasing and decreasing current transients in said secondary winding.

17. In a regulating system, a dynamo-electric machine, an excitation circuit therefor, regulating means for controlling said excitation circuit for small and gradual changes in an electrical characteristic of said machine, and means comprising electric discharge means operative in response to large and sudden changes in an electrical characteristic of said machine for abruptly changing the excitation of said machine in accordance with the rate of change of said last mentioned electrical characteristic.

18. In a regulating system, an alternating current dynamo-electric machine, an excitation circuit therefor, regulating means for controlling the energization of said excitation circuit for small and gradual changes in the voltage of said machine, means for rectifying said voltage, a capacitor connected to be charged from said rectifying means, a resistance in series relation with said capacitor, a second resistance in parallel relation with said capacitor and said first resistance for providing a discharge path for said capacitor, and means comprising electric discharge means for abruptly controlling the energization of said excitation circuit, said electric discharge means being connected to be controlled in accordance with charging and discharging transients of said capacitor in said first resistance.

19. In a regulating system, an alternating current dynamo-electric machine, an excitation circuit therefor, regulating means for controlling the energization of said excitation circuit for small and gradual changes in the voltage of said machine, means for rectifying said voltage, a transformer having a primary winding connected to be energized in accordance with said direct current voltage and a secondary winding connected to be energized in accordance with current transients in said primary winding, and means comprising electric discharge means connected to control said voltage in accordance with increasing and decreasing current transients in said secondary winding.

In witness whereof, I have hereunto set my hand.

ALAN S. FITZ GERALD.